US006139957A

United States Patent [19]

Craton

[11] Patent Number: 6,139,957

[45] Date of Patent: Oct. 31, 2000

[54] CONDUCTOR INSULATED WITH FOAMED FLUOROPOLYMER AND METHOD OF MAKING SAME

[75] Inventor: Gary L. Craton, Newton, N.C.

[73] Assignee: CommScope, Inc. of North Carolina, Hickory, N.C.

[21] Appl. No.: 09/143,326

[22] Filed: Aug. 28, 1998

[51] Int. Cl.[7] .............................. B32B 15/00; D02G 3/00

[52] U.S. Cl. .......................... 428/379; 428/372; 428/375; 428/383; 174/110 F; 174/110 FC; 174/110 SR

[58] Field of Search .................................... 428/372, 379, 428/383

[56] References Cited

U.S. PATENT DOCUMENTS

| | | | |
|---|---|---|---|
| 3,953,566 | 4/1976 | Gore . | |
| 4,304,713 | 12/1981 | Perelman | 174/110 FC |
| 4,368,350 | 1/1983 | Perelman . | |
| 4,394,460 | 7/1983 | Chung et al. . | |
| 4,543,368 | 9/1985 | Smearing et al. . | |
| 4,560,829 | 12/1985 | Reed et al. | 174/110 FC |
| 4,663,095 | 5/1987 | Battais | 174/110 FC |
| 4,711,811 | 12/1987 | Randa . | |
| 4,716,073 | 12/1987 | Randa . | |
| 5,032,621 | 7/1991 | Buckmaster et al. . | |
| 5,086,078 | 2/1992 | Harclerode et al. . | |
| 5,462,803 | 10/1995 | Wessels . | |
| 5,468,782 | 11/1995 | Mehan | 428/379 |
| 5,483,020 | 1/1996 | Hardie et al. . | |
| 5,493,071 | 2/1996 | Newmoyer . | |
| 5,514,837 | 5/1996 | Kenny et al. . | |
| 5,554,236 | 9/1996 | Singles et al. . | |
| 5,576,515 | 11/1996 | Bleich et al. . | |
| 5,613,524 | 3/1997 | Martucci . | |
| 5,614,319 | 3/1997 | Wessels et al. | 428/379 |
| 5,619,016 | 4/1997 | Newmoyer . | |
| 5,670,244 | 9/1997 | Taylor et al. . | |
| 5,770,819 | 6/1998 | Mehan | 174/110 F |
| 5,814,768 | 9/1998 | Wessels et al. | 174/110 FC |
| 5,932,847 | 8/1999 | Mayfield | 174/110 FC |

*Primary Examiner*—William Krynski
*Assistant Examiner*—J. M. Gray
*Attorney, Agent, or Firm*—Alston & Bird LLP

[57] ABSTRACT

A communications cable is provided having at least one elongate electrical conductor surrounded by a layer of insulating material, said layer comprising a foamed fluorinated polymer formed using a liquid or solid blowing agent having a vaporization temperature at ambient temperature of between about 140° F. and about 700° F. The elongate electrical conductors can be provided as at least one pair of twisted wires, each wire thereof surrounded by a layer of insulating material comprising the foamed fluorinated polymer. The communications cable includes insulated wires which possess a layer of foamed fluorinated polymer insulating material having uniform thickness and electrical properties along the length of the wire. In addition, the fluorinated polymer can be applied on the conductor in a relatively thin layer which minimizes the amount of fluorinated polymer material used to insulate the individual conductors. The present invention also includes a method of making an insulated conductor using these solid or liquid blowing agents.

24 Claims, 1 Drawing Sheet

CONDUCTOR INSULATED WITH FOAMED FLUOROPOLYMER AND METHOD OF MAKING SAME

FIELD OF THE INVENTION

The present invention relates broadly to flame retardant communication cables and more particularly to blowing agents for use in producing insulation for flame retardant communications cable.

BACKGROUND OF THE INVENTION

Insulated wires such as those used in communications cable often include flame retardant insulating materials. These flame retardant insulating materials allow these cables to be located in plenum air spaces of buildings or in other locations where flame retardancy and low smoke generation are important properties for the cable. In communications cables, these insulated wires are often provided as twisted pairs consisting of two insulated conductors twisted about each other to form a two conductor group.

The flame retardant insulating materials conventionally used include fluorinated polymers such as fluorinated ethylene-propylene (FEP), ethylenetrifluoroethylene (ETFE), and ethylenechlorotrifluoroethylene (ECTFE). Although these fluorinated polymers impart the necessary flame retardant properties to the plenum cable, these polymers are generally quite expensive. Therefore, it is desirable to minimize the amount of fluorinated polymer material used to insulate conductors for communications cables.

One method for minimizing the amount of insulating material used to insulate conductors is to foam the polymer insulating material. Foaming the insulating material also has the benefit of improving the electrical transmission characteristics of the resulting cable. Typically, the insulating materials are foamed using a gas blowing agent such as nitrogen or carbon dioxide. The conventional method of using gas blowing agents for insulation is to feed the polymer insulating material to an extruder and inject the gas blowing agent into the polymer melt. The polymer insulating material and blowing agent are then blended and a layer of the insulating material is applied around the conductor. Preferably, the insulating material is applied as a thin layer to further reduce the amount of insulating material used in the cable.

Although this is a common method for applying insulating material to conductors, there are problems associated with foaming polymer insulating material with gas blowing agents. In particular, it is difficult to control the amount of gas blowing agent fed to the extruder. Therefore, if a thin insulating layer of the foamed polymer is to be applied to the conductor, small variations in the process conditions often occur which result in disproportionately large changes in the characteristics of the foamed polymer. For this reason, it is difficult to maintain close manufacturing tolerances for density, thickness, dielectric constant, etc. This is particularly a problem at the high temperatures used to melt fluorinated polymers. As a result, it is difficult to produce a layer of foamed fluorinated polymer insulating material having uniform or consistent properties along the length of a wire. Therefore, the electrical properties of the insulated conductor and the cable suffer.

An additional problem that is encountered in using gas blowing agents and in particular, nitrogen, for foaming fluorinated polymers is that the cell size of the resulting polymer insulation is too large for thin insulating layers such as 30 mils or less. As a result, there are breaks in the insulation thereby affecting the insulative properties of the fluorinated polymer layer.

Another problem associated with using gas blowing agents is that the small port used to inject the gas blowing agent into the extruder often becomes blocked by the polymer material or by airborne dust and dirt. As a result, the extruder must be taken off-line and the port cleaned thereby preventing the operation of the insulating process. Therefore, there is a need to find an alternative to using gas blowing agents to produce foamed fluorinated polymer insulation for insulated conductors.

SUMMARY OF THE INVENTION

In accordance with the present invention, a communications cable is provided having at least one elongate electrical conductor surrounded by a layer of insulating material comprising a foamed fluorinated polymer such as fluorinated ethylene-propylene (FEP). The foamed fluorinated polymer is formed using a liquid or solid blowing agent having a vaporization temperature at ambient temperature of between about 140° F. and about 700° F. and the resulting foamed polymer insulation includes a small amount of this blowing agent. Preferably, the blowing agent is a nonflammable fluorinated hydrocarbon optionally substituted with an alkoxy group. Examples of these nonflammable fluorinated hydrocarbons include perfluorododecane ($C_{12}F_{26}$), methoxynonaf luorobutane ($C_4F_9OCH_3$), and mixtures thereof. Alternatively, the blowing agent can be a hydrocarbon selected from the group consisting of C8 to C22 straight chained or branched aliphatic hydrocarbons, C8 to C22 substituted or unsubstituted monocyclic or polycyclic aromatic hydrocarbons, and low molecular weight petroleum-based oils. For example, the blowing agent can be tetradecane, nonadecane, hexamethylbenzene, or a mixture thereof. The blowing agent is generally present in the insulation in an amount of less than about 1% by weight of the insulating material. The insulating material can also include a nucleating agent such as boron nitride. The insulating material is provided as a thin layer preferably having a thickness of less than about 30 mil, and more preferably of less than about 15 mil.

In the communications cables of the invention, the elongate electrical conductors are generally provided as at least one pair of twisted wires, each wire thereof surrounded by a layer of the foamed fluorinated polymer insulating material. In addition to the at least one twisted pair of fluorinated polymer-insulated wires, the communications cable can further include at least one additional pair of twisted wires, each wire thereof surrounded by a layer of a non-fluorinated polymer insulation. For example, the non-fluorinated polymer insulation can be a foamed polyolefin such as a foamed polyethylene. The twisted pairs of insulated wire can be provided in a jacket which surrounds and protects the wires from the environment.

The present invention also provides a method of making an insulated conductor comprising the steps of feeding a fluorinated polymer (e.g. FEP) and a blowing agent having a vaporization temperature at ambient pressure of between about 140° F. and about 700° F. into an extruder apparatus, heating the fluorinated polymer and the blowing agent to a predetermined temperature above the melting point of the fluorinated polymer and above the ambient pressure vaporization temperature of the blowing agent, blending the melted fluorinated polymer and the blowing agent, applying a layer of the blend around an advancing electrical conductor, and vaporizing the blowing agent to foam and expand the fluorinated polymer to produce an insulated conductor with a foamed fluorinated polymer insulation. The blowing agent is preferably a blowing agent comprising a nonflammable fluorinated hydrocarbon optionally substituted with an alkoxy group. Exemplary nonflammable fluorinated hydrocarbons include perf luorododecane ($C_{12}F_{26}$), methoxynonaf luorobutane ($C_4F_9OCH_3$), and mixtures thereof. Alternatively, the blowing agent can be a hydrocarbon selected from the group consisting of C8 to C22 straight chained or branched aliphatic hydrocarbons, C8 to C22 substituted or unsubstituted monocyclic or polycyclic aromatic hydrocarbons, low molecular weight petroleum-based oils, and mixtures thereof (e.g. tetradecane, nonadecane, hexamethylbenzene, or a mixture thereof).

In operation, the blowing agent is preferably fed to the extruder at a rate of between about 0.05% and 1% by weight of the blend. The blowing agent can be fed into the extruder apparatus through the same port as the fluorinated polymer, especially when the blowing agent is solid at ambient temperature and pressure. The blowing agent can also be fed into a different port, generally downstream from the feed port for the fluorinated polymer, especially when the blowing agent is liquid at ambient temperature and pressure. Typically, the liquid blowing agent is fed at a rate between about 50 and about 1000 $\mu$l/min. In addition to the fluorinated polymer and the blowing agent, a nucleating agent such as boron nitride can be fed to the extruder apparatus and blended with the polymer melt.

The present invention also includes a method of making a flame retardant communications cable that includes a twisted pair of insulated conductors. This method of making a communications cable includes the steps described above and further includes the steps of forming a twisted pair using two of the insulated wires and forming a jacket around the twisted pair of insulated wires. More than one twisted pair can be formed and enclosed within the jacket to form the communications cable. In addition, at least one twisted pair of wires insulated with a non-fluorinated polymer insulation can be combined with the twisted pairs of fluorinated polymer-insulated wires and these twisted pairs enclosed in a jacket to form the communications cable.

There are numerous benefits associated with the present invention. In particular, the layer of foamed fluorinated polymer insulating material can be applied in a relatively thin layer (less than about 30 mils) and has a uniform thickness and uniform electrical properties along the length of the wire. Therefore, the foamed fluorinated polymer insulation can meet very close manufacturing tolerances. The foamed fluorinated polymer insulation also provides a cable having a high velocity of propagation. Moreover, insulated wire can be produced at high throughput in accordance with the invention.

BRIEF DESCRIPTION OF THE DRAWINGS

Other features and advantages of the present invention will become apparent from the following detailed description of the invention taken in conjunction with the drawings, in which.

DETAILED DESCRIPTION OF THE PREFERRED EMBODIMENTS

Figure 1:
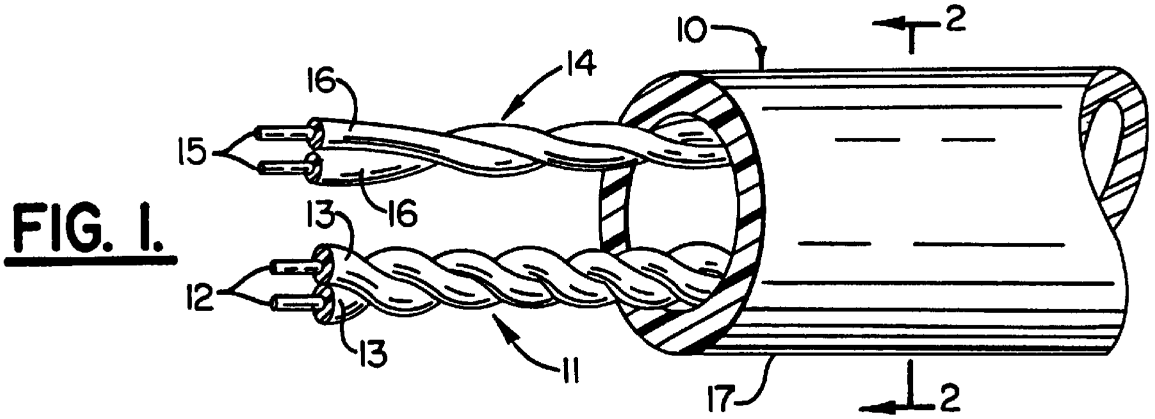
FIG. 1 is a perspective view of a cable according to a preferred embodiment of this invention having two pairs of twisted wires.
Figure 2:
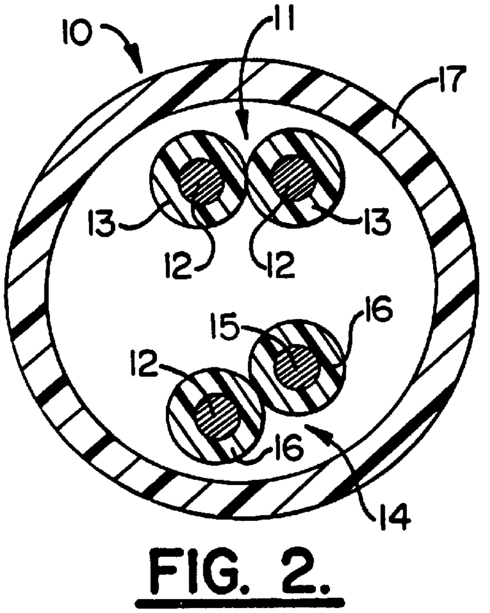
FIG. 2 is a cross-sectional view of the cable of FIG. 1 taken along lines 2—2 illustrating two pairs of twisted wires having insulating materials.

Referring now to FIGS. 1 and 2, there is shown a multi-pair communications cable designated generally by 10 having two pairs of twisted wires. A first pair of twisted wires 11 is comprised of conductors 12 each surrounded by a layer of a first insulating material 13. A second pair of twisted wires 14 comprises conductors 15 surrounded by a layer of a second insulating material 16. The second insulating material may be the same as the first insulating material or, if desired, may be a different insulating material. The conductors 12 and 15 may be a metallic wire of any of the well-known metallic conductors used in wire and cable applications, such as copper, aluminum, copper-clad aluminum, and copper-clad steel. Preferably, the wire is 18 to 26 AWG gauge. As shown most clearly in FIG. 2, the two pairs of twisted wires 11 and 14 may be enclosed in an insulating jacket 17 to form the multi-pair cable 10.

The layer of a first insulating material 13 is a foamed fluorinated polymer therefore providing a cable 10 having excellent flame retardant properties and low smoke generation. Preferably, the fluorinated polymer insulation 13 is a high-melting fluorinated polymer having a melting point of greater than about 480° F. Suitable high-melting fluorinated polymers include fluorinated ethylene-propylene (FEP), perfluoroalkoxypolymers (PFA's), and mixtures thereof. Exemplary PFA's include copolymers of tetrafluoroethylene and perfluoropropylvinylether (e.g. TEFLON PFA 340) and copolymers of tetrafluoroethylene and perfluoromethylvinylether (MFA copolymers or MFA's which are available from Ausimont S.p.A). The layer 13 of the fluorinated polymer insulating material has a thickness of preferably less than about 30 mil, more preferably less than about 15 mil, and even less than about 10 mil.

The layer of a first insulating material 13 is foamed or expanded using a blowing agent that is solid or liquid at ambient temperature and pressure. Preferably, these blowing agents have a vaporization temperature at ambient pressure of between about 140° F. and about 700° F. The blowing agent is generally present in an amount of less than about 1% by weight of the insulating material.

The blowing agent used in the present invention is preferably a nonflammable fluorinated hydrocarbon optionally substituted with an alkoxy group. Preferably, these blowing agents include at least 4 carbon atoms, are highly fluorine-substituted (at least 50% substituted), and are liquid or solid at ambient temperature and pressure. Examples of these blowing agents include methoxynonafluorobutane ($C_4F_9OCH_3$) available as HFE-7100 from 3M Co., perfluorododecane ($C_{12}F_{26}$) available as FLUORINERT FC 40 from 3M Co., and mixtures thereof. These particular blowing agents are liquid at ambient temperature and pressure and have vaporization temperatures at ambient pressure of 142° F. and 140° F., respectively.

Alternatively, the blowing agents used in the invention can be hydrocarbon blowing agents that are liquid or solid at ambient temperature and pressure. Exemplary hydrocarbon blowing agents include C8 to C22 straight chained or branched aliphatic hydrocarbons (e.g. nonadecane and tetradecane), C8 to C22 substituted or unsubstituted monocyclic or polycyclic aromatic hydrocarbons (e.g. hexamethylbenzene), low molecular weight petroleum-based oils (e.g. JAYFLEX 215 and NORPAR 12 from Exxon), and mixtures thereof. The vaporization temperatures of these exemplary blowing agents range from about 370° F. to about 630° F.

The blowing agents of the invention possess numerous properties that are advantageous for their use in plenum air spaces. In particular, these blowing agents are non-toxic, are non-ozone depleting, are chemically stable at the service temperature of the cable (e.g. at 60° C. and above), have a low dissipation factor (e.g. less than 0.0010 at 1 MHz), have a low dielectric constant (less than 2.30 at 1 MHz), have a Hildebran solubility parameter of between 7.0 and 7.6, have a vapor pressure of less than 0.01 mm Hg at room temperature, and yield an excellent foam structure. In addition, the fluorinated hydrocarbons are nonflammable.

The polymers foamed by the liquid and solid blowing agents of the invention will typically contain small amounts of the blowing agents in the resulting foamed polymer. The presence of these blowing agents can be used as a tell-tale indicator that the foamed polymer has been blown using these blowing agents. The blowing agents of the invention are classified as physical blowing agents and primarily undergo only a phase change to a gas at the elevated temperatures used to foam the insulation, and this gas formation foams or expand the insulation. Upon cooling of the polymer insulation, these blowing agents return to their liquid or solid phase at ambient temperature and pressure. These physical blowing agents can be distinguished from chemical blowing agents which decompose at elevated temperatures to form a gas such as nitrogen or carbon dioxide, and other decomposition products, and are not present in their original form in the foamed insulation.

The insulating material preferably also includes a small amount of a nucleating agent, e.g., between 0.01% and 3% by weight of the blend. The nucleating agent provides nucleation sites for the gas bubbles during the foaming process. For example, when boron nitride (e.g. HIGH FLOW FMX-1 from ICI Chemicals) is used as a nucleating agent in the present invention along with the blowing agents of the invention, the average cell diameter of the resulting foam is between 10 and 40 $\mu$m. In addition, other additives can optionally be used in the layer 13 to enhance the material compatibility and processing of the mixture. For example, the insulating composition can also contain suitable additives, such as pigments, thermal stabilizers, acid acceptors and processing aids.

The layer of a second insulating material 16 can be a high-melting fluorinated polymer as described above, a low melting fluorinated polymer (e.g. ethylenetrifluoroethylene (ETFE) or ethylenechlorotrifluoroethylene (ECTFE)), or a non-fluorinated material such as a polyolefin. Polyolefins such as polyethylene and polypropylene may be used to reduce the cost of the cable but do not enhance the flame retardance of the cable 10. The layer 16 can also be foamed by known methods to reduce the amount of material necessary to insulate the conductors 15. The layer of a second insulating material 16 can contain conventional additives as described above and if desired may further contain a flame retardant composition such as antimony oxide. Generally, the second insulating material is selected along with the first insulating material to provide a cable 10 which meets the flame and smoke standards for plenum cable set forth in Underwriter's Laboratory Standard 910 entitled "Test Method For Fire and Smoke Characteristics of Cables Used in Air-Handling Spaces".

The assembly of multi-pairs of twisted wires is referred to as a cable core. Although FIGS. 1 and 2 illustrate a cable 10 comprising two pairs of twisted wires, it will be understood by one skilled in the art that the cable can contain more than two pairs of twisted wires. As illustrated, a jacket 17 preferably surrounds the twisted wire pairs 11 and 14. The jacket is typically formed of a material suitable for plenum cable use such as a fluorinated polymer, polyvinylchloride, or a polyvinylchloride alloy.

The insulated conductors of the invention are preferably made by feeding the fluorinated polymer and the blowing agent into an extruder apparatus and blending the fluorinated polymer and the blowing agent. The fluorinated polymer used as the insulating material is blended with an effective amount of the blowing agent to cause initial cells to form within the mixture. Preferably, there is between about 0.05% and about 1.0% by weight of the blowing agent present in the mixture. Because the blowing agent is liquid or solid, it is easy to control the amount of the blowing agent that is fed to the extruder and blended with the fluorinated polymer. Typically, if the blowing agent is solid, it is fed to the extruder through the same port as the fluorinated polymer and can be provided as separate pellets or blended with the fluorinated polymer to form compounded pellets. In addition, because the nucleating agent is typically solid, it is generally fed to the extruder through this same port and can be compounded with the polymer or provided as separate pellets. If the blowing agent is liquid, it is typically fed to the extruder through a port downstream from the fluorinated polymer port so that the liquid blowing agent can be blended with the fluorinated polymer after it has melted. Preferably, the liquid blowing agent is fed to the extruder at a rate of between about 50 and about 1000 $\mu$l/min.

The fluorinated polymer and blowing agent are heated in the extruder apparatus to a predetermined temperature above the melting point of the fluorinated polymer and above the ambient pressure vaporization temperature of the blowing agent. Because the melt is pressurized in the extruder apparatus (e.g. to about 2000 psig), however, the blowing agent is generally liquid in the extruder apparatus. Preferably, the fluorinated polymer and the blowing agent are heated to between about 500° F. and 750° F. in the extruder apparatus. The amount of the blowing agent and the temperature of the melt determine the characteristics of the insulating material, and specifically the dielectric constant of the insulating material and the corresponding velocity of propagation of the conductor. The higher the temperature and the higher the concentration of the blowing agent, the higher the amount of foaming that occurs. Higher amounts of foaming result in a lower dielectric constant for the insulation and a higher velocity of propagation for the insulated conductor.

Once the fluorinated polymer and the blowing agent are heated to above the melting point of the fluorinated polymer and above the vaporization temperature of the blowing agent, a metered amount of the melt is extruded onto an advancing conductor using suitable means such as a crosshead die. At least one layer of the fluorinated polymer is applied around the conductor in the extruder apparatus. The conductor then advances out of the extruder apparatus and the polymer insulation foams and expands due to the change from high pressure to atmospheric pressure. Specifically, because the blowing agent is above its vaporization temperature at ambient pressure, the blowing agent vaporizes causing expansion of the polymer material and the formation of the foamed layer of insulating material 13. The fluorinated polymer expands at least about 10% by volume and may expand more than 20% by volume, or even more than about 40% by volume once it exits the extruder apparatus.

In producing the communications cables of the invention, two of the thus produced insulated conductors can be formed into a twisted pair of conductors 11. The twisted pair of conductors 11 can then be combined with other twisted conductor pairs having fluorinated polymer insulation or non-fluorinated polymer insulation and a jacket 17 extruded over the twisted pairs to form the communications cable 10.

In accordance with the invention, the flame retardant communication cables of the invention include insulated wires which possess a layer of foamed fluorinated polymer insulating material having uniform thickness and uniform electrical properties along the length of the wire. The fluorinated polymer can be applied on the conductors in a relatively thin layer (less than about 30 mils) which minimizes the amount of fluorinated polymer material used to insulate the individual conductors. As a result, the thinner resulting cables can be more easily installed in conduit or used in other applications. In addition, the decreased amount of fluorinated polymer material results in reduced smoking of the cable material when exposed to flame. Because liquid or solid blowing agents are used, it is also easier to adjust the properties of the insulating material such as its dielectric constant than if high pressure gasses are used to blow the insulation. Further, the foamed fluorinated polymer insulation provides a cable having a higher velocity of propagation than conventional plenum cables. The process of the invention increases the rate at which the insulated wire can be produced.

The present invention will now be further illustrated by the following non-limiting examples.

EXAMPLE 1

TE 9407 from E. I. DuPont de Nemours Co. including FEP and an nucleating agent was fed into an extruder apparatus. JAYFLEX 215 from Exxon, a low molecular weight petroleum-based oil, was added as a blowing agent to the extruder at a rate of 0.2 ml per minute. At a line speed of 870 feet per minute, the extrudate was applied to 24 awg copper wire at a thickness of 7.5 mils. Forty thousand feet of insulated wire was produced without cone breaks or bare wire. The resulting insulation had the following properties:

Tensile strength: 3000 psi

Ultimate elongation: 430%

Typical cell size: 20–40 microns

Void content: 20%

Blowing agent content: 0.18 ml/1000 ft

EXAMPLE 2

Ten grams of powdered hexamethylbenzene were mixed with 990 grams of CX 5010 (FEP containing a boron nitride nucleating agent and sold by E. I. DuPont de Nemours Co.) and charged to a feed hopper in a laboratory scale extruder. The mixture was processed at a temperature of 350° C. (660° F.). The collected material had a void content of 25%.

EXAMPLE 3

The process of Example 2 was conducted using tetradecane, nonadecane, and JAYFLEX 215 as blowing agents. Foamed fluorinated polymer extrudate was produced.

EXAMPLE 4

5100 FEP from E. I. DuPont de Nemours Co. and a boron nitride concentrate (HIGH FLOW FMX-1 from ICI Chemicals) were fed to an extruder through the feed port. A methoxynonafluorobutane blowing agent (HFE-7100 from 3M) was fed through a port in the barrel wall using a common pistol type pump. The injection port was located approximately fifteen inches from the barrel end and the screw used had a Saxxon mixing element comprising the last fifteen inches of the screw. A 24 awg copper wire was coated with the extrudate with a 7.2 mil thick layer. The void content was 17%. Spark faults were fewer than one per 20,000 feet of insulated wire.

EXAMPLE 5

The process of Example 4 was conducted using JAXFLEX 215 and NORPAR 10 (Exxon) low molecular weight petroleum-based oil blowing agents. The flow rate at the injection pump was varied to produce foams having void contents of between 10% and 55%.

What is claimed is:

1. A communications cable comprising at least one pair of twisted elongate electrical conductors, each conductor of said at least one pair being surrounded by a layer of insulating material, said insulating material comprising a foamed fluorinated polymer and a blowing agent having a vaporization temperature at ambient pressure of between about 140° F. and about 700° F. and selected from the group consisting of perfluorododecane ($C_{12}$ $F_{26}$); methoxynonafluorobutane ($C_4F_9OCH_3$); a hydrocarbon selected from the group consisting of C8 to C22 straight chained or branched aliphatic hydrocarbons; C8 to C22 substituted or unsubstituted monocyclic or polycyclic aromatic hydrocarbons; low molecular weight petroleum-based oils; and mixtures thereof.

2. The communications cable according to claim 1 wherein said blowing agent is a mixture of perfluorododecanee and methoxynonafluorobutane.

3. The communications cable according to claim 1 wherein said blowing agent is selected from the group consisting of tetradecane, nonadecane, hexamethylbenzene, and mixtures thereof.

4. The communications cable according to claim 1 wherein said insulating material further includes a nucleating agent.

5. The communications cable according to claim 1 wherein said insulating material further comprises boron nitride.

6. The communications cable according to claim 1 wherein said blowing agent is present in an amount of less than about 1% by weight of the insulating material.

7. The communications cable according to claim 1 wherein said layer of insulating material has a thickness of less than about 30 mil.

8. The communications cable according to claim 1 wherein the thickness of said layer of insulating material is less than about 15 mil.

9. The communications cable according to claim 1 wherein said fluorinated polymer is fluorinated ethylene-propylene (FEP).

10. A communications cable comprising at least one pair of twisted wires, each wire of said at least one pair being surrounded by a layer of insulating material, said insulating material comprising a foamed fluorinated polymer and a liquid blowing agent having a vaporization temperature at ambient pressure of between about 140° F. and about 700° F., said liquid blowing agent being present in an amount less than 1% by weight of the insulating material and comprising methoxynonafluorobutane.

11. The communications cable according to claim 10 wherein said fluorinated polymer is fluorinated ethylene-propylene (FEP).

12. The communications cable according to claim 10 further comprising at least one additional pair of twisted wires, each wire thereof surrounded by a non-fluorinated polymer insulation.

13. The communications cable according to claim 12 wherein the non-fluorinated polymer insulation is a foamed polyethylene.

14. A communications cable comprising at least one pair of twisted wires, each wire of said at least one pair being surrounded by a layer of insulating material having a thickness of less than about 10 mil and comprising a foamed fluorinated ethylene-propylene having an average cell diameter between 10 and 40 μm and containing a nucleating agent.

15. The communications cable according to claim 14 wherein said layer of insulating material has a void content between 10 and 55 percent.

16. The communications cable according to claim 14 wherein said layer of insulating material has a thickness of less than about 7.5 mil.

17. A communications cable comprising a jacket and plurality of pairs of twisted wires disposed within said jacket, at least one said pairs of twisted wires being surrounded by a layer of insulating material having a thickness of less than about 10 mil and comprising a foamed fluorinated polymer having an average cell diameter between 10 and 40 μm and containing a nucleating agent.

18. The communications cable according to claim 17 wherein said layer of insulating material has a void content between 10 and 55 percent.

19. The communications cable according to claim 17 wherein said layer of insulating material is a foamed fluorinated ethylene-propylene and has a thickness of less than about 7.5 mil.

20. A communications cable comprising a jacket and plurality of pairs of twisted wires disposed within said jacket, each wire of each of said pairs being surrounded by a layer of insulating material having a thickness of less than about 10 mil and comprising a foamed fluorinated polymer having an average cell diameter between 10 and 40 μm and containing a nucleating agent.

21. The communications cable according to claim 20 wherein said layer of insulating material has a void content between 10 and 55 percent.

22. The communications cable according to claim 20 wherein said layer of insulating material is a foamed fluorinated ethylene-propylene and has a thickness of less than about 7.5 mil.

23. A communications cable comprising a jacket and plurality of pairs of twisted wires disposed within said jacket, each of said wires comprising a 24 awg copper conductor, at least one of said pairs of twisted wires being surrounded by a layer of insulating material having a thickness of less than about 10 mil and comprising a foamed fluorinated ethylene-propylene having an average cell diameter between 10 and 40 μand containing a nucleating agent and a void content between 10 and 55 percent.

24. A communications cable comprising a jacket and plurality of pairs of twisted wires disposed within said jacket, each of said wires comprising a 24 awg copper conductor, each wire of each of said pairs being surrounded by a layer of insulating material having a thickness of less than about 10 mil and comprising a foamed fluorinated ethylenepropylene having an average cell diameter between 10 and 40 μm and containing a nucleating agent and a void content between 10 and 55 percent.

* * * * *

UNITED STATES PATENT AND TRADEMARK OFFICE
CERTIFICATE OF CORRECTION

PATENT NO. : 6,139,957
DATED : October 31, 2000
INVENTOR(S) : Craton

It is certified that error appears in the above-identified patent and that said Letters Patent is hereby corrected as shown below:

Column 8, lines 23-24, "perfluorododecanee" should read --perfluorododecane--.

Column 10, line 17, "μand" should read --μm and--; line 25, "ethylenepropylene" should read --ethylene-propylene--.

Signed and Sealed this

Fifteenth Day of May, 2001

*Attest:*

NICHOLAS P. GODICI

*Attesting Officer*

*Acting Director of the United States Patent and Trademark Office*